United States Patent
Oldfield et al.

(10) Patent No.: US 6,766,480 B2
(45) Date of Patent: Jul. 20, 2004

(54) USING TASK DESCRIPTION BLOCKS TO MAINTAIN INFORMATION REGARDING OPERATIONS

(75) Inventors: Barry J Oldfield, Boise, ID (US); Robert A. Rust, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 560 days.

(21) Appl. No.: 09/808,713

(22) Filed: Mar. 14, 2001

(65) Prior Publication Data

US 2002/0166078 A1 Nov. 7, 2002

(51) Int. Cl.[7] .............................................. G06F 11/00
(52) U.S. Cl. ............................................................ 714/52
(58) Field of Search ............................ 714/52, 54, 765, 714/766, 801, 805; 710/55, 54, 53

(56) References Cited

U.S. PATENT DOCUMENTS

| | | | | |
|---|---|---|---|---|
| 4,433,388 A | * | 2/1984 | Oosterbaan | 714/52 |
| 5,404,495 A | * | 4/1995 | Yoneda | 714/6 |
| 5,893,162 A | * | 4/1999 | Lau et al. | 711/153 |
| 6,523,087 B2 | * | 2/2003 | Busser | 711/114 |
| 6,567,891 B2 | * | 5/2003 | Oldfield et al. | 711/114 |
| 2002/0023240 A1 | * | 2/2002 | Yamamoto et al. | 714/6 |
| 2002/0133783 A1 | * | 9/2002 | Oldfield et al. | 714/800 |
| 2002/0166077 A1 | * | 11/2002 | Jacobson | 714/6 |

* cited by examiner

*Primary Examiner*—Robert Beausoliel
*Assistant Examiner*—Bryce P. Bonzo

(57) ABSTRACT

A disk controller includes memory that is accessible by both a microprocessor and an operation logic. Information needed by the operation logic to perform an operation is stored in a task description block in memory by the microprocessor, and a pointer to the task description block is added to a task description block queue. The operation logic is then able to access task description blocks, based on the pointers in the queue, at will and perform the corresponding operations.

27 Claims, 5 Drawing Sheets

USING TASK DESCRIPTION BLOCKS TO MAINTAIN INFORMATION REGARDING OPERATIONS

TECHNICAL FIELD

This invention relates to maintaining information regarding operations to be performed, and particularly to using task description blocks to maintain information regarding operations.

BACKGROUND OF THE INVENTION

Modem, high-capacity data storage systems often utilize a plurality of physical disk drives for redundant storage of data. This arrangement speeds data access as well as protecting against data loss that might result from the failure of any single disk.

There are two common methods of storing redundant data. According to the first or "mirror" method, data is duplicated and stored on two separate areas of the storage system. In a disk array, for example, identical data is stored on two separate disks. This method has the advantages of high performance and high data availability. However, the mirror method is also relatively expensive, effectively doubling the cost of storing data.

In the second or "parity" method, a portion of the storage area is used to store redundant data, but the size of the redundant storage area is less than the remaining storage space used to store the original data. For example, in a disk array having six disks, five disks might be used to store data, with the sixth disk being dedicated to storing redundant data, which is referred to as "parity" data. The parity data allows reconstruction of the data from one data disk, using the parity data in conjunction with the data from surviving disks. The parity method is advantageous because it is less costly than the mirror method, but it also has lower performance and availability characteristics in comparison to the mirror method.

Aspects of this invention involve storing redundant data according to parity techniques. In conventional disk arrays utilizing parity storage, the space on the storage disks are configured into multiple storage stripes, where each storage stripe extends across the storage disks. Each stripe consists of multiple segments of storage space, where each segment is that portion of the stripe that resides on a single storage disk of the disk array.

FIG. 1 illustrates a conventional disk array 12 having six storage disks 13. In this simplified example, there are five storage stripes extending across the storage disks. FIG. 1 highlights data and storage segments of a single one of these five stripes. Data segments of the indicated stripe are indicated by cross-hatching. The corresponding parity segment of this same stripe is illustrated in solid black. Generally, of the six segments comprising any given stripe, five of the segments are data segments and the sixth segment is a parity segment.

This type of parity storage is referred to as 5+1 parity storage, indicating that there are five data segments for every single parity segment. This scheme is more generally referred to as N+1 grouping, where N is the actual number of data segments in a data stripe.

N+1 redundancy grouping such as illustrated in FIG. 1 protects against the loss of any single physical storage device. If the storage device fails, its data can be reconstructed from the surviving data. The calculations performed to recover the data are straightforward, and are well-known. Generally, a single parity segment P is calculated from data segments $D_0$ through $D_{N-1}$ in accordance with the following equation:

$$P + x_0 + x_1 + x_2 + x_{N-1}$$

where $x_0$ through $x_{N-1}$ correspond to the data from data segments $D_0$ through $D_{N-1}$. After the loss of any single data segment, its data can be recovered through a straightforward variation of the same equation.

In many systems, however, it is becoming important to protect against the loss of more than a single storage device. Thus, it is becoming necessary to implement N+2 grouping in redundant storage systems.

While N+2 redundancy grouping enhances data protection, it also involves more complex calculations—both in initially calculating parity segments and in reconstructing any lost data segments.

A general form of the N+2 parity computation is as follows:

$$P + p_0 x_0 + p_1 x_1 + p_2 x_2 + p_{N-1} x_{N-1}$$

$$Q + q_0 x_0 + q_1 x_1 + q_2 x_2 + q_{N-1} x_{N-1}$$

where:
  P is the value of a first parity segment;
  Q is the value of a second parity segment;
  $x_0$ through $x_{N-1}$ are the values of the data segments
  $p_0$ through $p_{N-1}$ and $q_0$ through $q_{N-1}$ are constant coefficients that are particular to a given parity scheme.

These equations form a two-equation system that, by the rules of linear algebra, can potentially solve for any two unknowns $x_a$ through $x_b$ which represent the data from a single stripe of any two failed storage devices. One requirement is that the two sets of coefficients $p_i$ and $q_i$ be linearly independent. This requirement is met, for example, if $p_0=1$, $p_1=1$, $p_2=1$; etc.; and $q_0=1$, $q_1=2$, $q_2=3$; etc. Other examples are also possible.

The mathematics of N+2 parity are well-known and are not the primary subject of this description. However, it is apparent from the brief description given above that N+2 parity computations are significantly more complex than N+1 parity computations. In actual implementations of N+2 disk arrays, this complexity threatens to limit the data throughput of storage device controllers and, consequently, of the overall disk array.

A co-pending U.S. patent application Ser. No. 09/808,710, entitled "Efficient Parity Operations", to inventor Michael B. Jacobson, describes a more efficient way to maintain adequate data throughput in spite of the added complexity resulting from N+2 parity calculations, and is hereby incorporated by reference. However, even with the more efficient methods and means described in this co-pending application, data throughput of storage device controllers can still be adversely affected by inefficient memory structures for storing the information necessary to perform the parity calculations. This invention includes methods and apparatus for using task description blocks to maintain information regarding parity (or other) operations and maintain adequate data throughput.

SUMMARY

Using task description blocks to maintain information regarding operations is described herein.

In accordance with one aspect of the invention, a task description block queue stores a pointer to each of multiple task description blocks, and each task description block stores information for one operation. The data for an operation is stored in memory. Each task description block stores information necessary for operation logic to perform a single operation, including pointers to the data stored in memory and a pointer to a result location in memory where results of the operation are to be stored by the operation logic. Once all of this information is stored in the task description block, a pointer to the task description block is stored in the task description block queue, allowing the operation logic to perform the operation whenever it desires.

In accordance with another aspect of the invention involving parity operations, a task description block queue stores a pointer to each of multiple task description blocks, and each task description block stores information for one parity operation. The data for a parity operation is stored in memory, as is a plurality of different coefficients that are used for different parity operations. Each task description block stores information used by parity operation logic to perform a single parity operation, including: a type of operation to be performed, a size of the task description block, an optional tag number (for consistency checking), an indication of a response queue into which status results of the operation to be performed are to be stored, pointers to the data stored in memory, a pointer to a subset of the plurality of coefficients, an indication of the number of coefficients in the subset, and a pointer to a result location in memory where results of the parity operation are to be stored by the parity operation logic. Once all of this information is stored in the task description block, a pointer to the task description block is stored in the task description block queue, allowing the parity operation logic to perform the parity operation whenever it desires.

DETAILED DESCRIPTION

Parity Operations

Figure 1:
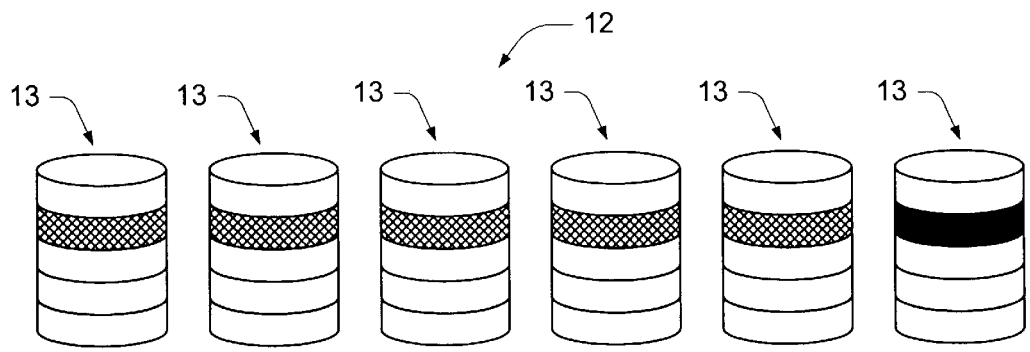
FIG. 1 is a block diagram showing N+1 redundancy grouping in accordance with the prior art.
Figure 2:
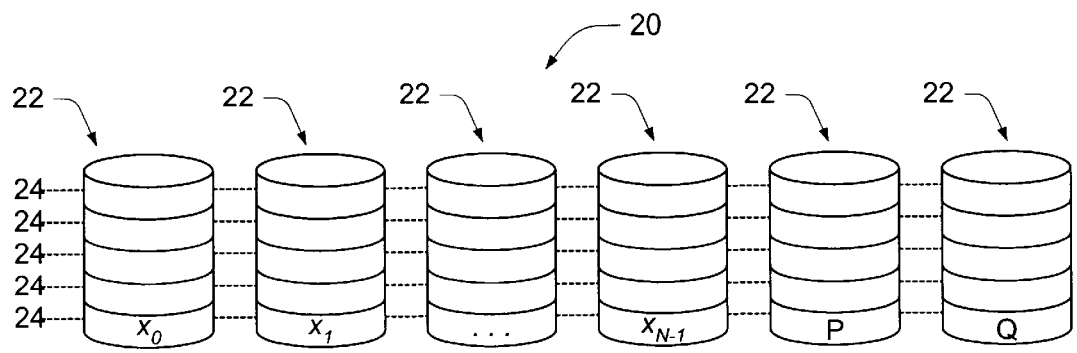
FIG. 2 is a block diagram showing N+2 redundancy grouping as used in the described embodiment of the invention.

Referring to FIG. 2, a redundant data storage system 20 in accordance with the invention utilizes storage disks 22 with data stripes 24. Each data stripe 24 comprises a plurality of data segments $x_0$ through $x_{N-1}$ and at least two corresponding parity segments P and Q. P and Q are derived from the data segments $x_0$ through $x_{N-1}$, from a first set of parity coefficients $p_0$ through $p_{N-1}$, and from a second set of parity coefficients $q_0$ through $q_{N-1}$. The parity coefficients correspond to respective data segments in accordance with the equations below:

$$P = p_0 x_0 + p_1 x_1 + p_2 x_2 + p_{N-1} x_{N-1}$$

$$Q = q_0 x_0 + q_1 x_1 + q_2 x_2 + q_{N-1} x_{N-1}$$

In accordance with the invention, parity operations are generally classified as parity segment generation operations, parity segment regeneration operations, and data segment reconstruction operations.

A parity segment generation operation is performed when creating a new data stripe—the parity segments are created based on completely new data.

A parity segment regeneration operation is performed with respect to an existing stripe, either when new data causes the addition of a new data segment or when a read/modify/write cycle modifies one or more data segments. In a parity segment regeneration operation, the parity segments are modified incrementally, without reading an entire data stripe. For example, suppose that new data causes the addition of a new data segment $x_4$. $P_{NEW}$ is calculated as follows:

$$P_{NEW} = P_{OLD} + p_4 x_4$$

Similarly, suppose that data segment $x_2$ is modified as the result of a read/modify/write cycle. In this case, $P_{NEW}$ is calculated as follows:

$$P_{NEW} = P_{OLD} - p_2 x_{2OLD} + p_2 x_{2NEW}$$

Calculating new P and Q values from the old data segment values involves significantly fewer memory reads than calculating P and Q from scratch after every stripe modification.

In accordance with the invention, parity segment regeneration operations are further classified as either parity regenerations resulting from added data segments or parity regenerations resulting from a modified data segment.

Data segment reconstruction operations include two sub-classifications: single data segment reconstruction operations and double data segment reconstruction operations. A single data segment can be reconstructed from either the P or the Q parity segment in combination with the surviving data segments. Generally, a data segment $x_a$ is reconstructed from either parity segment P or Q as follows:

$$x_a = f(p_0, p_a)x_0 + f(p_1, p_a)x_1 + \ldots + f(p_a)P + \ldots + f(p_{N-1}, p_a)x_{N-1}$$

$$x_a = f(q_0, q_a)x_0 + f(q_1, q_a)x_1 + \ldots + f(q_a)Q + \ldots + f(q_{N-1}, q_a)x_{N-1}$$

where f( ) is a transformation function that generates an appropriate coefficient particular to the parity generation code being used.

One implementation of these equations is as follows:

$$x_a = p_a^{-1}(p_0 x_0 + p_1 x_1 + \ldots + P + \ldots + p_{N-1} x_{N-1})$$

$$x_a = p_a^{-1}(q_0 x_0 + q x_1 + \ldots + Q + \ldots + q_{N-1} x_{N-1})$$

Two data segments can be reconstructed from the P and the Q parity segments in combination with the surviving data segments. Generally, two data segments $x_a$ and $x_b$ are reconstructed from parity segments P and Q as follows:

$$x_a = f(p_0, q_0, p_a, p_b, q_a, q_b)x_0 + f(p_1, q_1, p_a, p_b, q_a, q_b)x_1 +$$
$$\ldots + f(p_a, p_b, q_a, q_b)P + f(p_k, q_k, p_a, p_b, q_a, q_b)x_k +$$
$$f(p_{k+1}, q_{k+1}, p_a, p_b, q_a, q_b)x_{k+1} + \ldots + f(p_a, p_b, q_a, q_b)Q +$$
$$\ldots + f(p_{N-1}, q_{N-1}, p_a, p_b, q_a, q_b)x_{N-1}$$

$$x_b = f(p_0, q_0, p_a, p_b, q_a, q_b)x_0 + f(p_1, q_1, p_a, p_b, q_a, q_b)x_1 +$$

-continued $$f(p_a, p_b, q_a, q_b)P + f(p_k, q_k, p_a, p_b, q_a, q_b)x_k +$$
$$f(p_{k+1}, q_{k+1}, p_a, p_b, q_a, q_b)x_{k+1} + \ldots +$$
$$f(p_a, p_b, q_a, q_b)Q + \ldots + f(p_{N-1}, q_{N-1}, p_a, p_b, q_a, q_b)x_{N-1}$$

where f( ), again, is a transformation function that generates an appropriate coefficient particular to the parity generation code being used.

One implementation of these equations is as follows:

$$x_a = (p, q_b + p_b q_a)^{-1}((q_b p_0 + p_b q_0)x_0 + (q_0 p_1 + p_0 q_1)x_1 + \ldots +$$
$$q_b P + \ldots + (q_b p_k + p_b q_k)x_k + (q_b p_{k-1} + p_b q_{k+1})x_{k+1} +$$
$$\ldots + p_b Q + \ldots + (q_b p_{N-1} + p_b q_{N-1})x_{N-1})$$
$$x_b = (p_a q_b + p_b q_a)^{-1}((q_a p_0 + p_a q_0)x_0 + (q_a p_1 + p_a q_1)x_1 + \ldots +$$
$$q_a P + \ldots + (q_a p_k + p_a q_k)x_k + (q_a p_{k-1} + p_a q_{k+1})x_{k+1} +$$
$$\ldots + p_a Q + \ldots + (q_a p_{N-1} + p_a q_{N-1})x_{N-1})$$

Generally, all of the parity operations described above can be accomplished by using a different combination of known coefficients chosen from a base set having a finite number of such coefficients. These coefficients include $p_0$–$p_{N-1}$, $q_0$–$q_{N-1}$, and the coefficients resulting from the transform functions f( ). Any particular parity operation utilizes a subset of these coefficients, depending on the actual data or parity segment being calculated. The particular subset of coefficients needed for a particular calculation depends on both the classification of the operation and upon the specific data and/or parity segments involved. Thus, within a given classification of parity operation, there are different situations or scenarios, each of which calls for a different subset of coefficients. For example, one scenario occurs when adding data segment $x_5$ to a stripe, when coefficients $p_5$ and $q_5$ are needed. Another scenario occurs when adding data segment $x_6$ to a stripe, when coefficients $p_6$ and $q_6$ are needed.

Coefficient Subsets

Figure 3:
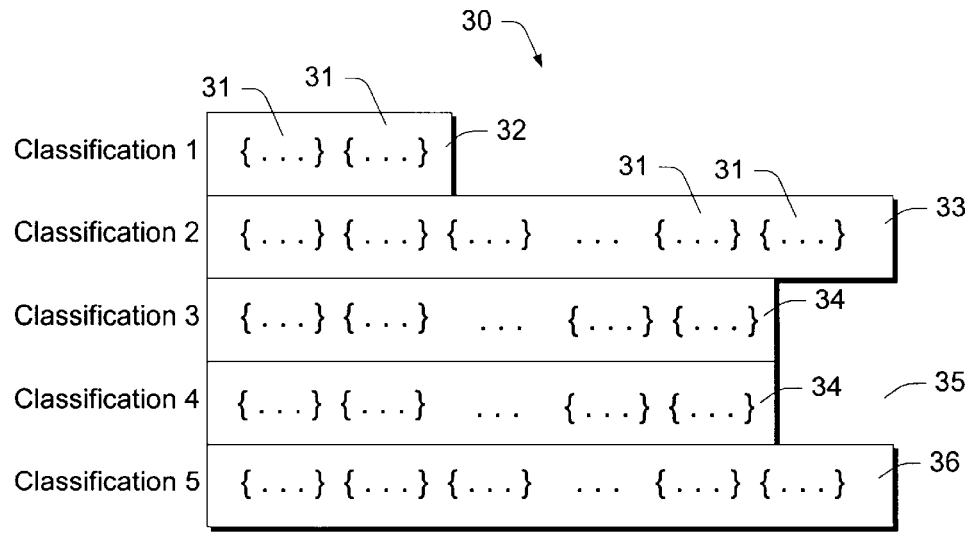
FIG. 3 is a block diagram illustrating layout of a memory table in accordance with the invention.

FIG. 3 shows a memory array 30 that contains plurality of coefficient subsets 31. Each coefficient subset is a list or concatenation of pre-selected and/or pre-computed coefficients that are applied to corresponding segments of data to produce a parity computation result. In accordance with the invention, a different subset of coefficients is pre-selected and stored for each different operation scenario. The subsets are then formatted and packed in a linear memory array for reference and direct use by parity operation logic. Because different scenarios call for different numbers of coefficients, the subsets are not of the same length or size.

Each coefficient is a single byte in the described embodiment of the invention. The term "packed" means that the subsets or strings of coefficients are concatenated in linear memory, preferably with no intervening unused spaces, to conserve storage space.

There is a one-to-one correspondence between a coefficient in a subset and a segment of data (either a data segment or a parity segment) when performing the parity operation. Each coefficient is applied only to its corresponding data segment or parity segment to produce the result of the operation.

One coefficient subset is included in the array for each possible parity computation case or scenario. Unique indexing formulas are used to locate the beginning of a subset in the array for each specific computational scenario. Generally, the subsets are arranged in pairs, corresponding to computations involving P and Q, respectively.

Referring to FIG. 3, memory array 30 includes a plurality of classification groups 32, 33, 34, 35, and 36, each of which contains the coefficient subsets 31 corresponding to a particular parity operation classification. Each subset in a classification group has coefficients for a specific scenario that occurs within the group's classification. With one exception, the coefficient subsets are the same size within any given classification group.

Within array 30, particular classification groups are located by computing a group offset from the beginning of the array to the beginning of the group. This group offset is the base index into the array for the group. To locate a specific coefficient subset within a classification group, a subset offset from the beginning of the group is added to the base index. This produces an index into the array that locates the beginning of the desired coefficient subset.

In accordance with one embodiment of the invention, the general parity operation classifications are defined as follows:

1. Parity Generation Operations—Partial or full new stripe that has no pre-existing data or parity.
2. Parity Regeneration Operations Resulting From Added Segments—Incremental growth of a stripe by incorporating new data segments into the two parity segments.
3. Parity Regeneration Operations Resulting From Segment Modification—Modification of a data segment that is already incorporated in the two parity segments (read/modify/write).
4. Single Data Segment Reconstruction—Reconstruction of a single data segment using one of the parity segments and the surviving data segments from the strip. Reconstruction from either P or Q parity segments is supported because in the case of two failed storage devices, one of the failed storage devices may hold P or Q.
5. Double Data Segment Reconstruction—Reconstruction of two data segments of a stripe using the two parity segments P and Q, and the surviving data segments from the stripe.

Structure of Classification 1 Coefficient Subsets

The first classification group 32 of the array contains the coefficient subsets for parity generation operations. A parity generation operation generates new P and Q segments from new data segments $x_0$ through $x_{N-1}$. There are only two coefficient subsets in this classification group. The subsets correspond respectively to the generation of parity segments P and Q:

P: $\{p_0, p_1, \ldots p_{N-1}\}$ and

Q: $\{q_0, q_1, \ldots q_{N-1}\}$

Each of these subsets is the same length (N).

Structure of Classification 2 Coefficient Subsets

The second classification group 33 of the array contains the coefficient subsets for parity operations that add incrementally to a stripe. This type of operation updates P and Q segments in combination with any given contiguous range of new or added data segments $x_a$ through $x_b$ (where b<N and a<=b). There are multiple different scenarios of these operations, corresponding to every possible range a through b of data segments within data segments 0 through N–1. Each scenario calls for a different subset of coefficients. For example, if the new or added data segments are $x_3$ and $x_4$, the required coefficient subset to calculate P is $\{p_3, p_4\}$. If the new or added data segments are $x_2$ through $x_5$, the required coefficient subset to calculate P is $\{p_2, p_3, p_4, p_5\}$.

The total of possible ranges within data segments 0 through N−1 depends on the value of N.

Each coefficient subset of classification group 2 contains two initial parameters that indicate whether the subset applies to calculations of P or to calculations of Q. Each of these initial parameters is set to either "0" or "1". A value of "1" for the first of these coefficients indicates that the calculation involves parity segment P. A value of "1" for the second of these coefficients indicates that the calculation involves parity segment Q. Only one of these two parameters should be set equal to "1" at any given time.

The remaining coefficients in a Classification 2 subset are the sub-range of coefficients that are used to regenerate P and Q from newly added data stripes. Thus, the classification group contains a plurality of coefficient subsets of the form:

P: $\{1, 0, p_a, \ldots p_b\}$ and

Q: $\{0, 1, q_a, \ldots q_b\}$

Classification group 33 includes a plurality of subsets such as these, depending on N, corresponding to every range of a through b, within the larger range of 0 through N−1. The coefficient subsets in this section of the array have varying lengths or sizes, equal to b−a for each operation scenario.

Within this classification group, coefficient subsets are arranged and grouped by length. That is, the coefficient subsets containing the smallest number of coefficients are placed in the initial part of the classification group. The coefficient subsets containing the largest number of coefficients are placed at the end of the classification group. Within each of these groupings, the coefficient subsets are arranged in order according to the lower coefficient subscript of the range that is covered by the coefficient subset. Thus, the subsets having a=0 are positioned first, the subsets having a=1 next, and so on.

Structure of Classification 3 Coefficient Subsets

The coefficient subsets in the third classification group 34 are used to update P and Q when a single data segment is modified. This type of operation updates P and Q segments, given a modified data segment $x_a$.

As with the Classification 2 group, the first two parameters of each Classification 3 subset indicate whether the coefficients of the group are applicable to P calculations or to Q calculations. Each of these coefficients is set to either "0" or "1". A value of "1" for the first of these coefficients indicates that the subset coefficients apply to parity segment P. A value of "1" for the second of these coefficients indicates that the subset coefficients apply to involves parity segment Q.

Each subset contains a single remaining coefficient, corresponding to the data segment $x_a$ that is being modified:

P: $\{1, 0, p_a\}$ and

Q: $\{0, 1, q_a\}$

The third classification group 34 includes N pairs of such subsets, corresponding to all values of a from 0 through N−1. Note that these subsets correspond to a special case of the Classification 2 coefficient subsets, in which a=b, and can therefore be used when adding a single new data segment to a stripe.

Structure of Classification 4 Coefficient Subsets

The coefficient subsets in the fourth classification group 35 are used to reconstruct a single data segment $x_a$ based on one of the parity segments and the surviving data segments. The coefficients correspond closely to the Classification 1 coefficients, except that they are transformed according to the mathematics (f( )) of the chosen error correction code to perform a reconstruction operation:

P: $\{f(p_0, p_a), f(p_1, p_a), \ldots, f(p_a), \ldots, f(p_{N-1}, p_a)\}$

Q: $\{f(q_0, q_a), f(q_1, q_a), \ldots, f(q_a), \ldots, f(q_{N-1}, q_a)\}$

More specifically:

P: $(p, q_b + p_b q_a)^{-1}((q_b p_0 + p_b q_0), (q_0 p_1 +$
$\qquad p_0 q_1), \ldots, q_b P, \ldots, (q_b p_k + p_b q_k), (q_b p_{k-1} +$
$\qquad\qquad p_b q_{k+1}), \ldots, p_b Q + \ldots + (q_b p_{N-1} + p_b q_{N-1}))$ P: $(p_a q_b + p_b q_a)^{-1}((q_a p_0 + p_a q_0), (q_a p_1 + p_a q_1), \ldots, q_a P +$
$\qquad \ldots + (q_a p_k + p_a q_k), (q_a p_{k-1} +$
$\qquad\qquad p_a q_{k+1}), \ldots, p_a Q, \ldots, (q_a p_{N-1} + p_a q_{N-1}))$ The fourth classification group includes N pairs of such subsets, corresponding to all values of a from 0 through N−1. Note that in each subset, the coefficient $f(p_a)$ or $f(q_a)$ corresponds to data segment $x_a$.

Structure of Classification 5 Coefficient Subsets

The coefficient subsets in the fifth classification group 36 are used to reconstruct two data segments $x_a$ and $x_b$ based on the two parity segments and the surviving data segments. The coefficients correspond closely to the Classification 1 coefficients, except that they are transformed according to the mathematics (f( )) of the chosen error correction code to perform a reconstruction operation:

$x_a$: $\{f(p_0, q_0, p_a, p_b, q_a, q_b),$
$\qquad f(p_1, q_1, p_a, p_b, q_a, q_b), \ldots, f(p_a, p_b, q_a, q_b), \ldots,$
$\qquad f(p_k, q_k, p_a, p_b, q_a, q_b), f(p_{k+1}, q_{k+1}, p_a, p_b, q_a, q_b),$
$\qquad \ldots, f(p_a, p_0, q_a, q_b), \ldots, f(p_{N-1}, q_{N-1}, p_a, p_b, q_a, q_b)\}$ $x_b$: $\{f(p_0, q_0, p_a, p_b, q_a, q_b), f(p_1, q_1, p_a, p_b, q_a, q_b),$
$\qquad \ldots, f(p_a, p_b, q_a, q_b), \ldots, f(p_k, q_k, p_a, p_b, q_a, q_b),$
$\qquad f(p_{k+1}, q_{k+1}, p_a, p_b, q_a, q_b), \ldots, f(p_a, p_0, q_a, q_b),$
$\qquad \ldots, f(p_{N-1}, q_{N-1}, p_a, p_b, q_a, q_b)\}$ The fifth section of the array includes (N*(N−1))/2 pairs of such subsets, corresponding every possible combination of a and b within the range of 0 to N−1. Note that in each subset, the coefficient $f(p_a, p_b, q_a, q_b)$ corresponds to data segment $x_a$ or $x_b$, depending on which data segment is being reconstructed.

One possible implementation of these equations is as follows:

$x_a$: $(p_a, q_b + p_b, q_a)^{-1}(q_b, p_0 + p_b, q_0), (p_a, q_b +$
$\qquad p_b, q_a)^{-1}(q_b, p_1 + p_b, q_1), \ldots, (p_a, q_b +$
$\qquad p_b, q_a)^{-1} q_b, \ldots, (p_a, q_b + p_b, q_a)^{-1}(q_0, p_k +$
$\qquad p_0, q_k), (p_a, q_b + p_b, q_a)^{-1}(q_0, p_{k+1} +$
$\qquad p_0, q_{k+1}), \ldots, (p_a, q_b + p_b, q_a)^{-1} p_b, \ldots, (p_a, q_b +$
$\qquad p_b, q_a)^{-1}(q_0, p_{N-1} + p_0, q_{N-1})$ $x_b$: $(p_a, q_b + p_b, q_a)^{-1}(q_b, p_0 + p_b, q_0), (p_a, q_b + p_b, q_a)^{-1}(q_a, p_1 +$
$\qquad p_a, q_1), \ldots, (p_a, q_b + p_b, q_a)^{-1} q_a, \ldots, (p_a, q_b +$ -continued $$p_b, q_a)^{-1}(q_a, p_k +$$
$$p_a, q_k), (p_a, q_b + p_b, q_a)^{-1}(q_a, p_{k+1} +$$
$$p_a, q_{k+1}), \ldots, (p_a, q_b + p_b, q_a)^{-1}p_a, \ldots, (p_a, q_b +$$
$$p_b, q_a)^{-1}(q_a, p_{N-1} + p_a, q_{N-1})$$

Coefficient Subset Usage

Figure 4:
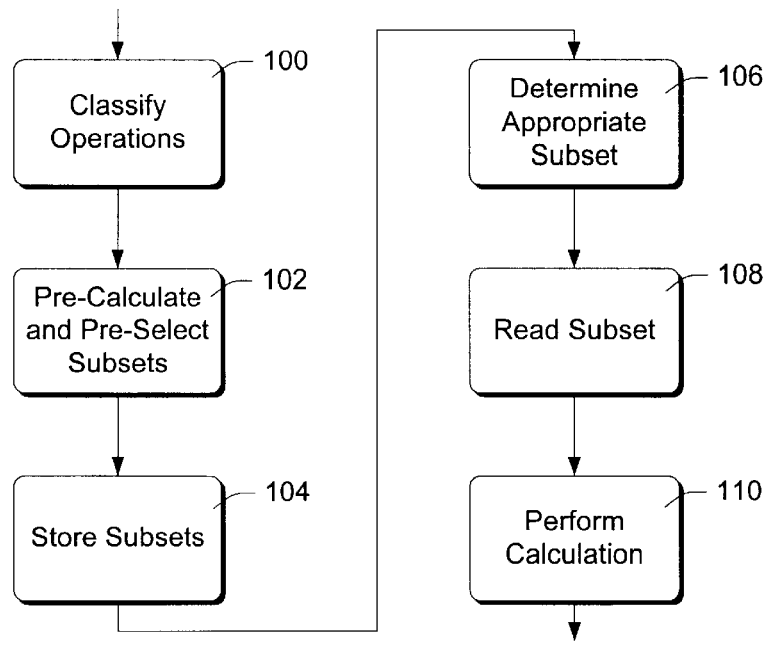
FIG. 4 illustrates a method of performing parity operations in accordance with certain embodiments of the invention.

FIG. 4 illustrates a method of performing parity operations in accordance with the array storage scheme described above. A first step 100 comprises classifying different parity operations into classifications that include parity segment generation operations, parity segment regeneration operations, and data segment reconstruction operations. More specifically, an operation is classified as either a parity generation operation, a parity regeneration operation resulting from added segments, a parity regeneration operation resulting from segment modification, a single data segment reconstruction operation or a double data segment reconstruction operation. Each classification of parity operations includes a plurality of different classification scenarios, each of which involves a respective subset of parity coefficients.

A step 102 comprises pre-calculating individual parity coefficients and pre-selecting subsets of parity coefficients for use in the different parity operations and the different scenarios of parity operations. This step is performed in accordance with the description already given.

A step 104 comprises storing all of the pre-selected parity coefficient subsets in an indexed linear memory array, where they can be accessed by parity computation logic. This step includes pre-formatting the coefficient subsets so that they can be efficiently utilized by hardware-based parity operation logic. In particular, the individual coefficients of each subset are packed in adjacent bytes or storage units and ordered in a way that is particular to the hardware-based parity operation logic. As a result of this step, the memory array contains a single coefficient subset corresponding to each different computation scenario.

The individual coefficients and the subsets of coefficients are packed with no intervening data elements. The subsets of the array are grouped and ordered as already described, with the coefficient subsets grouped into classification groups by order of their classifications. Within the second classification group, the subsets have varying sizes. In addition, the subsets in the second classification group are sub-grouped by size, and ordered in ascending order according to their lowest-numbered coefficient.

During parity operations, parity operation logic accesses the memory array to obtain the appropriate coefficient subsets for use in the different scenarios of parity operations. Thus, a step 106 comprises determining which of the stored subsets of parity coefficients is needed for a particular parity operation. This step involves determining the classification of the parity operation and a group offset into the linear memory array, indicating the beginning of the classification group corresponding to that parity operation classification. A subset offset is then calculated into the group, to the location of the desired coefficient subset.

Step 106 is straightforward except with regard to the second classification group. As described in detail above, the second classification group contains coefficient subsets of varying lengths or sizes, making it difficult to determine the offset of a particular coefficient subset. However, the inventors have discovered that when the second classification group is arranged as described, having ordered subgroups of same-sized coefficient subsets, an offset to a particular subgroup can be calculated as a function of the size of the coefficient subsets of the sub-group and of N (the largest number of coefficients contained by any sub-group). Specifically, the offset to a particular sub-group i corresponding to subset size $L_i$ is equal to $$((L_i-1)(12N+L_i(3N-2L_i-5))/6)-3(N-1).$$

This formula assumes the presence in each subset of the prepended pair of constants (described above) corresponding to P and Q. L, however, equals b−a. Within the sub-group i, the offset of a particular coefficient subset is equal to $a(L_i+2)$. Thus, the overall offset into the classification group, for a range of coefficients corresponding to $x_a$ through $x_b$, is $$(((L_i-1)(12N+L_i(3N-2L_i-5))/6)-3(N-1))+a(L_i+2).$$

The size of the second classification group is given by the following equation:

$$((N-1)(12N+N(3N-2N-5))/6)-3(N-1).$$

After determining the appropriate offset into the memory array, a step 108 is performed of reading the determined parity coefficient subset from memory. Step 110 comprises performing the particular parity operation with the subset of parity coefficients read from memory.

Disk Controller Operation

Figure 5:
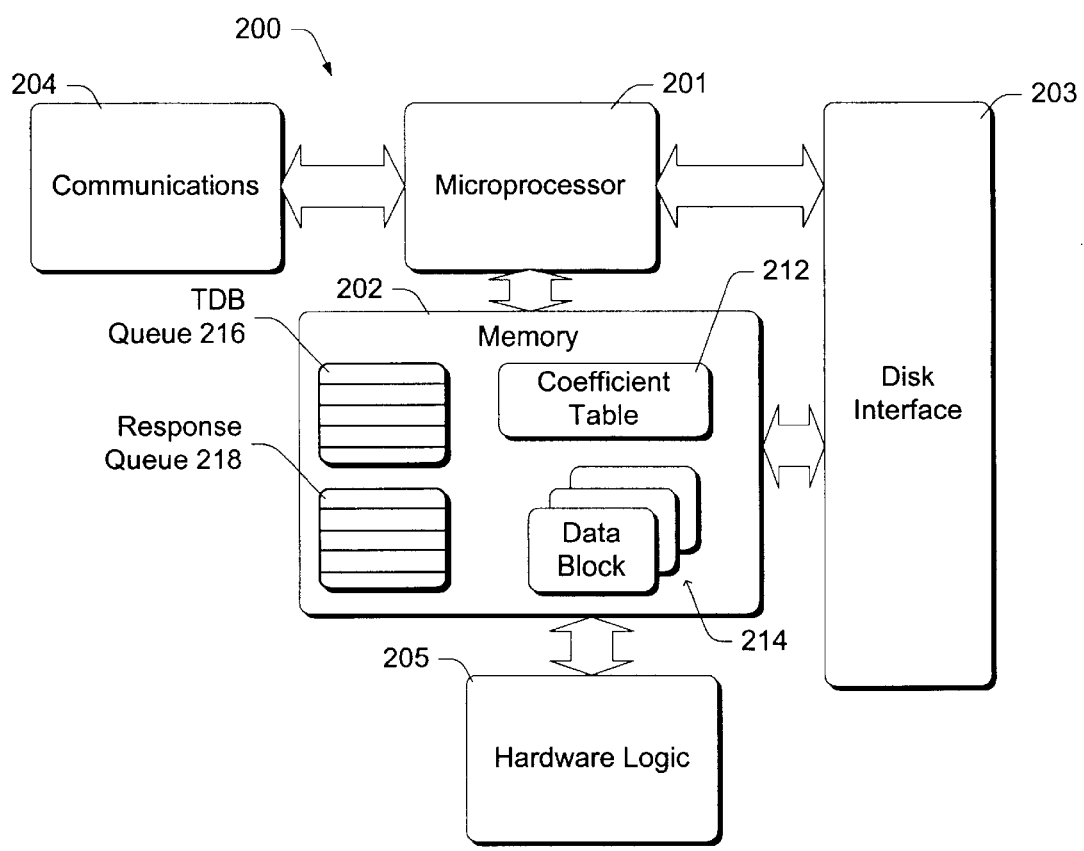
FIG. 5 is a block diagram showing pertinent components of a disk controller in accordance with the invention.

FIG. 5 illustrates the most pertinent components of a disk controller 200 in accordance with the invention. The disk controller includes a microprocessor 201 and associated memory 202. In addition, the disk controller has a hard disk interface component 203 and a communications component 204. The hard disk interface component provides a means of access to the hard disks associated with and controlled by the disk controller. The communications component acts as an interface between a host computer and the hard disk controller.

In addition to these components, hard disk controller 200 includes hardware-based parity operation logic 205 in the form of an application-specific integrated circuit (ASIC). The term "hardware-based" is intended to mean that this logic component, as opposed to software-based logic, does not retrieve and execute instructions from program memory. Rather, the logic component has dedicated, interconnected logic elements that process signals and data. Although hardware-based logic such as this is less flexible than a microprocessor or other instruction-based processors, hardware-based logic is often much faster than instruction-based logic.

In general, the disk controller operates as follows. Microprocessor 201 handles communications with the host computer and coordinates all data transfers to and from the host controller. In addition, the microprocessor coordinates all actual disk transfers. However, data is buffered in memory 202 prior to writing to disk. Parity operations are performed on data in memory 202 under the control of microprocessor 201.

During initialization, microprocessor 201 constructs a coefficient subset table 212 in memory 202. Subsequently, when it is time for a parity operation, microprocessor 201 determines the classification and scenario of the parity operation. Once this information is determined, the microprocessor creates a script that indicates the locations in memory 202 of one or more data segments and parity segments (referred to collectively as data blocks 214) that will be the object of the parity operation. The script indicates an offset into the coefficient subset table 212 at which the proper coefficient subset will be found for the parity operation, and the number of coefficients that are contained in the coefficient subset. The script also indicates the location in memory 202 at which the result of the requested calculation is to be placed. Each script stores information for a single parity operation and the memory structure for storing such scripts is referred to herein as a task description block (TDB). The TDB is stored in a particular location in memory 202 and a pointer to that location (e.g., a 32-bit address) is stored in a TDB queue 216 in memory 202. A response queue 218 is also stored in memory 202 and used by hardware logic 205 to return an indication to microprocessor 201 as to whether a parity operation was successful.

When a script is placed in memory, the hardware logic is notified by the presence of the pointer to the TDB for the script in queue 216. The hardware logic responds by (a) retrieving the designated coefficients, data segments, and parity segments, (b) performing the appropriate parity operation based on the designated coefficients, (c) returning the data and/or calculated parity segments to memory, and (d) indicating to microprocessor 201 whether the operation has been successfully completed by writing an entry into response queue 218.

The hardware logic is configured to perform the various different parity operations by summing products of coefficients and data/parity segments. The different operations actually vary only in the number and choice of coefficients, data segments, and parity segments. These variables are specified by the script. Thus, the operations lend themselves very conveniently to hardware-based calculations.

Figure 6:
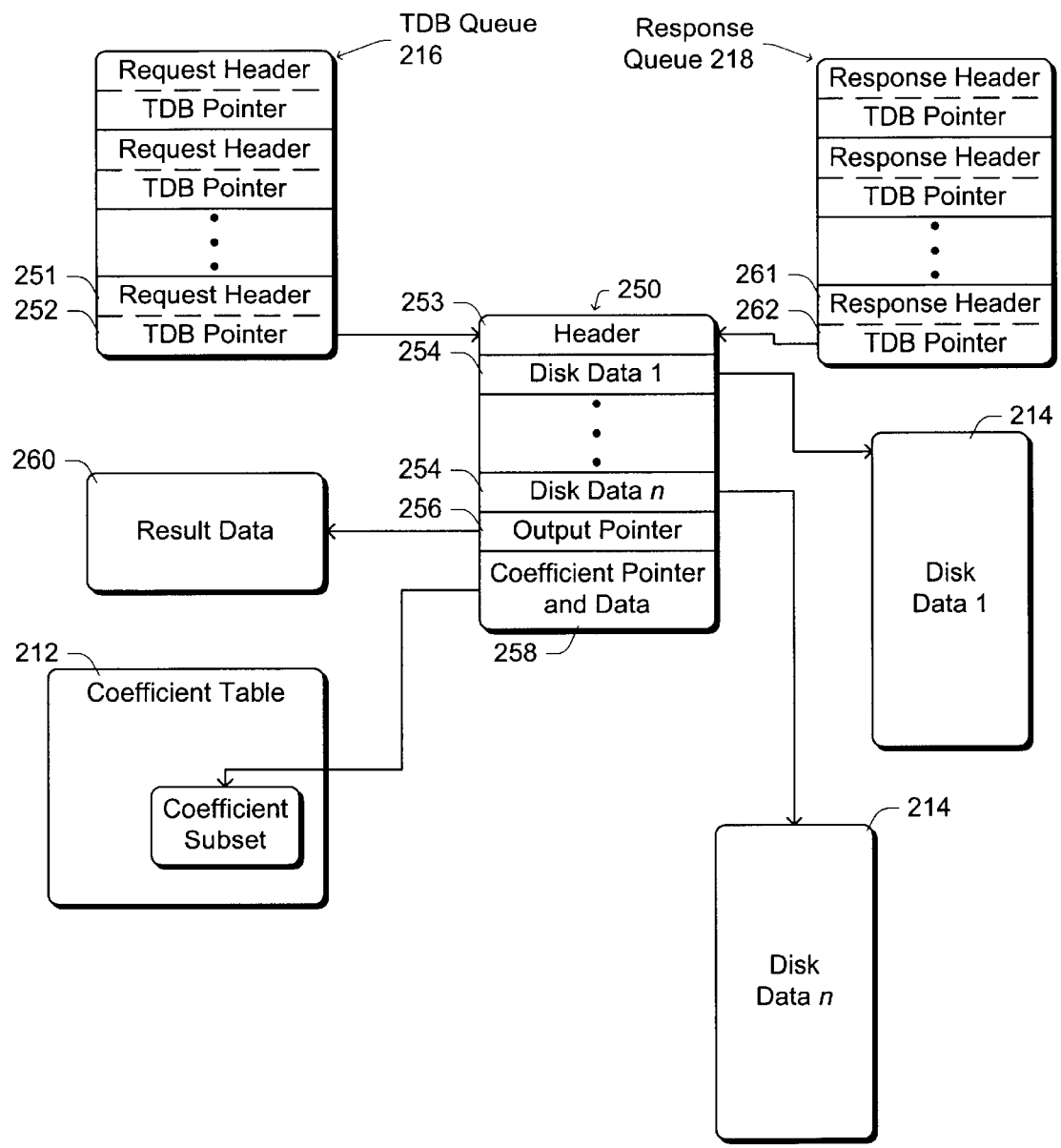
FIG. 6 illustrates an exemplary structure of a task description block in additional detail.

FIG. 6 illustrates an exemplary structure of a task description block 250 in additional detail. TDB 250 is described herein with reference to being accessed by hardware logic 205 to perform a parity operation based on the information in TDB 250. Alternatively, the memory structure illustrated in FIG. 6 could be used in other systems which perform the parity operation in different manners (e.g., by a microprocessor or other instruction-based processor executing software or firmware).

A TDB queue 216 includes multiple entries, and each queue entry includes both a request header and a TDB pointer. A TDB pointer 252 points to TDB 250 (e.g., stores the starting address for TDB 250 in memory 202), while a corresponding request header 251 stores various information about the requested operation to be carried out based on TDB 250. In one implementation, both TDB pointer 252 and request header 251 are 32-bit values, and request header 251 includes the following information: the size (e.g., in 8-byte double word groups) of TDB 250, an indication of the operation hardware logic 205 is to perform based on the data in TDB 250, whether tabbed consistency checking (discussed in more detail below) is to be performed, an identification of the response queue 218 into which operation completion information should be written, and a tag number (if tag-based consistency checking is being performed).

TDB 250 has multiple fields including a header 253, multiple disk data pointers 254, an output pointer 256 and a coefficient pointer and data 258. Header 253 includes various information about TDB, and in one implementation includes the following: the size (e.g., in 8-byte double word groups) of TDB 250, an indication of the operation hardware logic 205 is to perform based on the data in TDB 250 (e.g., an identification of one of the five classifications for parity operations discussed above), an execution priority for the operation hardware logic 205 is to perform based on the data in TDB 250 (e.g., different types of operations can be assigned different execution priorities, if desired), and a tag number (if tag-based consistency checking is being performed).

Each of the disk data pointers 254 points to a location in memory 202 of disk data for the parity operation (each points to one of data blocks 214 of FIG. 5). Depending on the parity operation being performed, the data pointed to by each pointer 254 can be a data segment or a parity segment of the stripe for which the parity operation is to be performed. The pointers 254 are arranged in accordance with an order known by hardware logic 205 (such as from a lowest numbered data segment in the stripe to a highest numbered data segment, followed by the P parity segment and then the Q parity segment), so that hardware logic 205 knows which segment data resides at which memory location for the parity operation. Output pointer 256 is a pointer to a location 260 in memory 202 where the results of the parity operation are to be written by parity operation logic 205. Depending on the type of parity operation being performed, the results of the operation can be either the P and Q parity values (e.g., for parity generation or parity regeneration operations), or a data segment(s) value (e.g., for data segment reconstruction). Although a single output pointer 256 is illustrated in FIG. 6, alternatively multiple output pointers may be included in TDB 250 (e.g., for multiple values generated, such as one pointer for the P value and one pointer for the Q value).

Coefficient pointer and data 258 includes a pointer to a location in coefficient table 30 where the subset of coefficients to be used by parity operation logic 205 are located. Within pointer and data 258 may also be an indication of the number of coefficients that are to be retrieved from the coefficient table (this may be separate from the indication of the type of parity operation that is to be performed as identified in header 253, or alternatively embedded (or inherent) in that indication). Thus, coefficient pointer and data 258 (in combination with header 253) gives parity operation logic 205 the necessary information of where to obtain coefficients for the parity operation and how many coefficients are to be obtained, as well as what parity operation to perform.

Once all of the necessary information is stored in a TDB 250 for a parity operation, microprocessor 201 adds an entry to TDB queue 216 including a pointer to that TDB and corresponding request header information. By queuing up operations in queue 216, and not adding the entry to queue 216 until the necessary data is available in the proper locations, parity operation logic 205 is certain to have the information it needs to perform the parity operation. Therefore, parity operation logic 205 is not delayed waiting for additional information regarding a parity operation while other parity operations are waiting in the queue, allowing for fast operation of logic 205.

Prior to performing the parity operation, parity operation logic 205 may optionally perform a consistency check to verify it is using the correct TDB. In one implementation, this consistency check is based on verifying the type of operation and size of the TDB. In this implementation, header 253 of TDB 250 includes, as indicated above, an indication of the type of operation to be performed and the size of TDB 250. To verify the correct TDB is being accessed, hardware logic 205 accesses the type of operation and TDB size in request header 251 and checks whether they match the type of operation and TDB size stored in header 253. If hardware logic 205 determines the two operation types and the two TDB sizes match, then the TDB 250 is verified as being the correct TDB; otherwise, the TDB is not the correct TDB and hardware logic 205 indicates to microprocessor 201 that the parity operation has failed due to a command mismatch (e.g., via an entry in response queue 218).

Additional consistency checking can be performed, and is referred to herein as tag-based consistency checking. When using tag-based consistency checking, microprocessor 201 assigns a tag number to the operation, which is stored in both request header 251 and header 253. Hardware logic 205, in addition to verifying the operation type and TDB size, also verifies that the tag numbers in headers 251 and 253 match. If the tag numbers match then the TDB 250 is verified as being the correct TDB (assuming the operation types and TDB sizes also matched); otherwise, the TDB is not the correct TDB and hardware logic 205 indicates to microprocessor 201 that the parity operation has failed due to a tag mismatch (e.g., via an entry in response queue 218).

Once hardware logic 205 completes an operation, the calculated result(s) of the operation is stored in the memory location 260 pointed to by output pointer 256. Additionally, an entry is added to response queue 218 that indicates the status of the operation performed by hardware logic 205. Multiple response queues 218 may exist, and the appropriate one that hardware logic 205 is to add an entry to is indicated in the request header 251 corresponding to the operation.

Each response queue 218 can include multiple entries, each of which includes a response header and TDB pointer. A TDB pointer 262 points to TDB 250 (e.g., stores the starting address for TDB 250 in memory 202), while a corresponding response header 261 stores various information about the operation that was carried out based on TDB 250. In one implementation, both TDB pointer 262 and response header 261 are 32-bit values, and response header 261 includes the following information: the size (e.g., in 8-byte double word groups) of TDB 250, an indication of the operation hardware logic 205 was to perform based on the data in TDB 250, whether tag-based consistency checking was to be performed, a "Parity All Zero" flag that is set if a dual parity block calculation results in P and Q parity blocks that contain only zeroes or a single parity block calculation results in a P parity block that contains only zeroes (the flag is also set if the operation is not a parity operation), a "Pattern Match" flag that is set if the source data matches a defined format pattern, an indication of what type of error (if any) occurred in performing the operation, and a tag number (if tag-based consistency checking is being performed). In one implementation, the following errors can be indicated via response header 261: a tag mismatch (the tag in header 251 of queue 216 does not match the tag in header 253 of TDB 250), a command mismatch (the operation type and TDB size in header 251 does not match the operation type and TDB size in header 253), a parity error (a parity error was detected on data returned from memory 202), a memory test data miscompare (if a memory test operation is being performed rather than a parity operation, this indicates that the data returned from memory 202 during a memory test was incorrect), and an illegal command (the operation types indicated in header 251 and header 253 are not legal values).

Thus, using the memory structure illustrated in FIG. 6, a single TDB is used to identify all of the necessary information for parity operation logic 205 to perform a parity operation. A single pointer can be used to identify each TDB, allowing multiple parity operations to be easily queued up in TDB queue 216 of FIG. 5. Parity operation logic 205 can then process the parity operations in a particular manner (e.g., in a first in/first out (FIFO) manner) by taking operations off queue 216.

Furthermore, as illustrated in FIGS. 5 and 6, the description of what operations need to be performed is separated from the component actually performing the work. This separation allows the two different processes (describing what needs to be done and actually doing what needs to be done) to operate independent of one another, without concern for how the other is being performed (or what component or entity is performing it). Thus, microprocessor 201 of FIG. 5 can set up the necessary information for parity operations without regard for what component is actually performing the parity operations (e.g., parity operations could be performed by hardware logic 205 or alternatively some other component (such as another microprocessor executing software instructions)). Similarly, hardware logic 205 can obtain the information for parity operations from memory 202 and perform the parity operations without concern for what entity set up the information into memory 202 or how the information was obtained.

Figure 7:
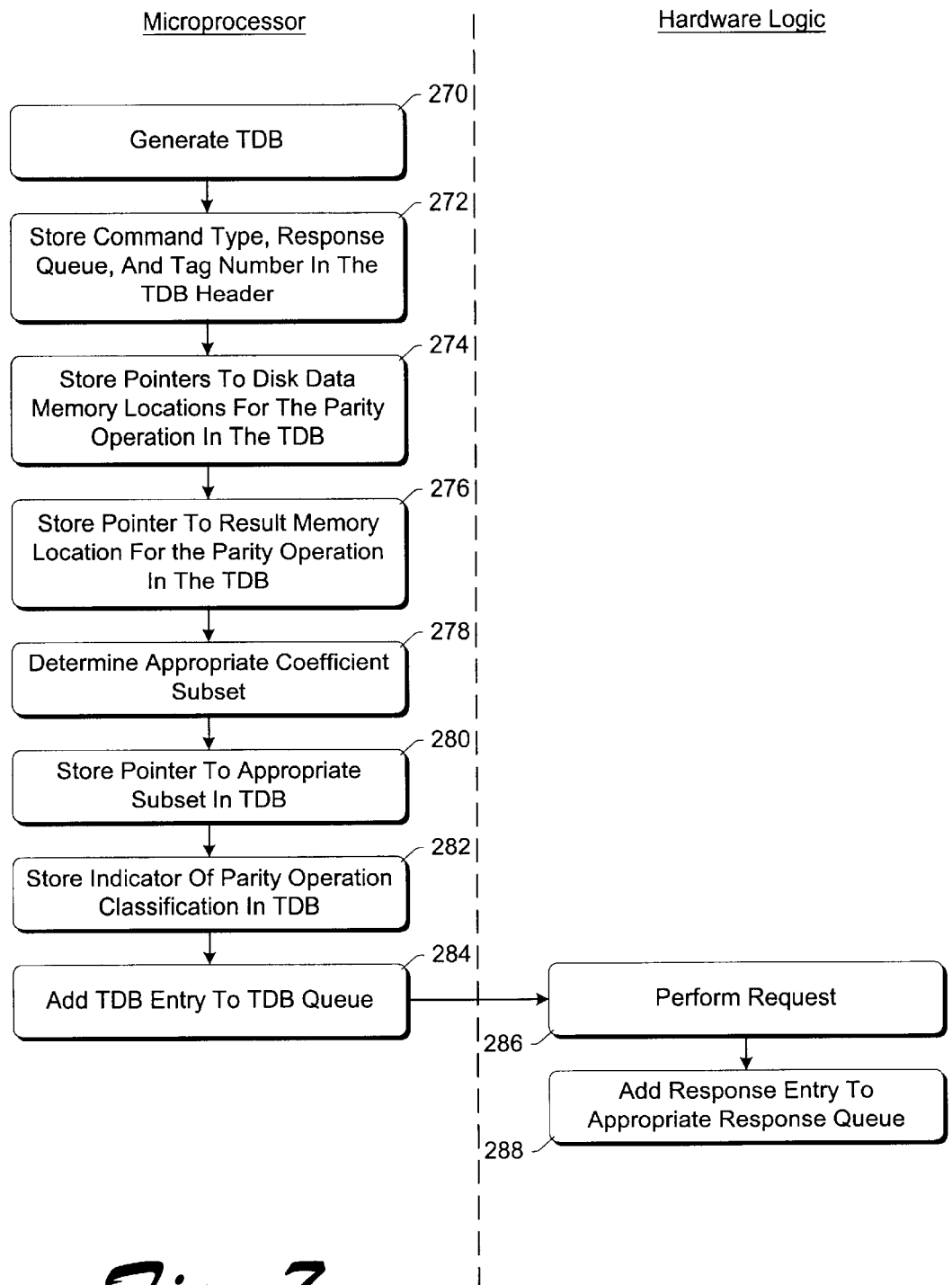
FIG. 7 illustrates a method of using a task description block in accordance with certain embodiments of the invention.

FIG. 7 illustrates a method of using a task description block for a parity operation in accordance with the memory structure described above. The method of FIG. 7 illustrates the actions performed by the microprocessor 201 and hardware logic 205 of FIG. 5 (actions performed by microprocessor 201 are on the left-hand side, while actions performed by hardware logic 205 are on the right-hand side). A first step 270 comprises generating a TDB for the parity operation to be performed. This generation can be performed in any of a variety of conventional manners (e.g., having memory allocated for the TDB, using previously allocated but unused memory, etc.). A step 272 comprises storing a command type, response queue identifier, and tag number (optionally) in a header of the TDB. Other information (discussed above) may also be stored in the header. A step 274 comprises storing pointers to the disk data memory locations for the parity operation into the TDB, and a step 276 comprises storing a pointer to a result memory location for the parity operation into the TDB. A step 278 comprises determining the appropriate coefficient subset to use (analogous to step 106 of FIG. 4 discussed above), and a step 280 comprises storing a pointer to that coefficient subset into the TDB. A step 282 comprises storing an indicator of the parity operation classification to the TDB, to inform the parity operation logic which parity operation is to be performed. Once all of this information is stored into the TDB, a step 284 comprises adding, to the TDB queue, an entry including a request header and a pointer to this newly populated TDB. Thus, the indication of the TDB is not added to the TDB queue until all of the data for the parity operation is available in memory 202, allowing the parity operation logic to access memory 202 and perform the parity operation whenever it desires.

At some point after the TDB queue entry is added, a step 286 comprises hardware logic 205 performing the requested operation. Upon the completion or failure of the operation, a step 288 comprises adding a response entry to the appropriate response queue (as identified in step 272 above) indicating whether the operation was satisfactorily completed or if an error occurred.

The discussion of FIG. 7 refers to the TDB entry (both request header and TDB pointer) being added to the TDB queue at the same time (step 284). Alternatively, the request header in the TDB queue may be populated as the information is available, with step 284 comprising adding just the TDB pointer to the queue entry (and inherently informing hardware logic 205 that the TDB queue entry is fully populated).

Although the invention has been described primarily with reference to performing different types of parity operations in redundant disk drive systems, the invention may alternatively be used in other situations. For example, the invention may be used to perform a hardware accelerated memory test, in which the memory address to be written to for verification is identified by a field 254 of FIG. 6, hardware logic 205 of FIG. 5 writes test data to the identified memory address, reads the data back from that memory address and stores the data read back in the location identified by pointer 256. By way of another example, the invention may be used to perform a copy function, in which the data to be copied is identified by a pointer(s) 254 and the location of the resultant copy identified by pointer 256, and hardware logic 205 performing the copying. By way of yet another example, the invention may be used to perform pattern matching, in which data segments to be compared are identified by pointers 254 and hardware logic 205 performs the comparison and writes the results of the comparison (e.g., an indication of whether the two data segments match) in the location identified by pointer 256. By way of yet another example, the invention may be used to perform checksum calculations, in which a data segment for which a checksum is to be calculated is identified by a pointer 254 and hardware logic 205 calculates the checksum and writes the resulting checksum value in the location identified by pointer 256.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A disk controller that performs parity operations in a redundant data storage system, the disk controller comprising:
   memory to store a plurality of task description blocks, each block identifying information for a parity operation to be performed;
   a parity operation logic, coupled to the memory, to access each of the plurality of task description blocks and perform a parity operation based on information identified in the task description block; and
   a response queue, and wherein the parity operation logic is further to write, into the response queue, status information regarding whether a parity operation was successfully performed or failed.

2. A disk controller as recited in claim 1, wherein the memory is further to store a task description block queue having a plurality of entries, wherein each entry identifies one of the plurality of task description blocks, and wherein the parity operation logic is to obtain information necessary to perform a parity operation by accessing the task description block identified by one of the plurality of entries.

3. A disk controller as recited in claim 1, wherein each of the plurality of task description blocks stores information needed to perform a corresponding parity operation, the information including:
   a plurality of disk data pointers, each identifying a location in the memory for disk data for the parity operation;
   an output pointer identifying a location in the memory where results of the parity operation are to be stored;
   a coefficient pointer identifying a location in the memory where parity coefficients for the parity operation are stored; and
   an identifier of a type of parity operation to be performed.

4. A disk controller as recited in claim 3, wherein the coefficient data further identifies a number of parity coefficients to be used for the parity operation.

5. A disk controller as recited in claim 3, wherein each of the plurality of disk data pointers is a pointer to a location in the memory where a data segment for the parity operation is stored.

6. A disk controller as recited in claim 1, wherein the parity operation logic is hardware-based logic.

7. A disk controller as recited in claim 1, wherein the parity operation logic is further to verify the consistency of each task description block prior to performing a parity operation based on the information identified in the task description block.

8. A disk controller that performs parity operations in a redundant data storage system, the disk controller comprising:
   memory to store a plurality of task description blocks, each block identifying information for a parity operation to be performed; and
   a parity operation logic, coupled to the memory, to access each of the plurality of task description blocks and perform a parity operation based on information identified in the task description block;
   wherein at least one of the plurality of disk data pointers is a pointer to a location in the memory where a parity segment for the parity operation is stored.

9. A method comprising:
   storing information for a parity operation in memory, wherein the parity operation is to either generate at least one parity segment for a stripe in a redundant data storage system or re-generate at least one data segment for the stripe; and
   making the information available to parity operation logic only after all of the information necessary for the parity operation is stored in the memory;
   wherein the storing comprises storing memory location identifiers of the information into a task description block corresponding to the parity operation, and wherein the making comprises adding an identifier of the task description block into a task description block queue that is accessible to the parity operation logic.

10. A method as recited in claim 9, wherein the storing comprises storing the information for the parity operation in the memory, and storing pointers to the information into a task description block corresponding to the parity operation.

11. A method as recited in claim 9, wherein the identifier of the task description block comprises a pointer to the task description block.

12. A method as recited in claim 9, wherein the storing comprises generating a task description block in the memory, the task description block including:
   a plurality of disk data pointers, each identifying a location in the memory for disk data for the parity operation;
   an output pointer identifying a location in the memory where results of the parity operation are to be stored;
   a coefficient pointer identifying a location in the memory where parity coefficients for the parity operation are stored; and
   an identifier of a type of parity operation to be performed.

13. A method of making information available to a hardware operation logic to perform operations based on one or more data segments, the method comprising:
   storing each of the one or more data segments for an operation in a different location in a memory;
   storing, in a task description block corresponding to the operation, a pointer to each of the different locations in memory;

storing, in the task description block, a pointer to a result location in memory where a result of the operation is to be stored; and storing, in a task description block queue, a pointer to the task description block.

14. A method as recited in claim 13, wherein the hardware operation logic is to perform parity operations, and wherein the method further comprises:

storing, in the memory, a plurality of coefficients to be used for different parity operations; and storing, in the task description block, a pointer to a subset of the plurality of coefficients that will be used by the parity operation logic for the parity operation.

15. A method as recited in claim 13, wherein each pointer to one of the plurality of different locations in memory comprises a pointer to a location in the memory where a data segment for the operation is stored.

16. A method as recited in claim 13, wherein the hardware operation logic is to perform memory test operations.

17. A method as recited in claim 13, wherein the hardware operation logic is to perform data copying operations.

18. A method as recited in claim 13, wherein the hardware operation logic is to perform pattern matching operations.

19. A method as recited in claim 13, wherein the storing the pointer to the task description block comprises storing, in the task description block queue, the pointer to the task description block after the pointers to each of the different locations in memory have been stored to the task description block.

20. A method of making information available to a hardware operation logic to perform operations based on one or more data segments, the method comprising:

storing each of the one or more data segments for an operation in a different location in a memory;

storing, in a task description block corresponding to the operation, a pointer to each of the different locations in memory;

storing, in the task description block, a pointer to a result location in memory where a result of the operation is to be stored;

storing, in a task description block queue, a pointer to the task description block;

wherein the hardware operation logic is to perform parity operations, and wherein the method further comprises:

storing, in the memory, a plurality of coefficients to be used for different parity operations;

storing, in the task description block, a pointer to a subset of the plurality of coefficients that will be used by the parity operation logic for the parity operation; and storing, in the task description block, an indication of how many coefficients are in the subset of the plurality of coefficients.

21. A method of making information available to a hardware operation logic to perform operations based on one or more data segments, the method comprising:

storing each of the one or more data segments for an operation in a different location in a memory;

storing, in a task description block corresponding to the operation, a pointer to each of the different locations in memory;

storing, in the task description block, a pointer to a result location in memory where a result of the operation is to be stored; and storing, in a task description block queue, a pointer to the task description block;

wherein at least one pointer to one of the plurality of different locations in memory comprises a pointer to a location in the memory where a parity segment for a parity operation is stored.

22. A method of making information available to a hardware operation logic to perform operations based on one or more data segments, the method comprising:

storing each of the one or more data segments for an operation in a different location in a memory;

storing, in a task description block corresponding to the operation, a pointer to each of the different locations in memory;

storing, in the task description block, a pointer to a result location in memory where a result of the operation is to be stored; and storing, in a task description block Queue, a pointer to the task description block;

wherein the storing the pointer to the task description block comprises storing the pointer to the task description block in the task description block queue only after the pointers to each of the plurality of different locations in memory have been stored to the task description block, and after the pointer to the result location has been stored to the task description block.

23. A method of making information available to a hardware operation logic to perform operations based on one or more data segments, the method comprising:

storing each of the one or more data segments for an operation in a different location in a memory;

storing, in a task description block corresponding to the operation, a pointer to each of the different locations in memory;

storing, in the task description block, a pointer to a result location in memory where a result of the operation is to be stored;

storing, in a task description block queue, a pointer to the task description block;

wherein the hardware operation logic is to perform checksum calculating operations.

24. A task description block to be used in a disk controller that performs a plurality of different types of parity operations in a redundant data storage system, the task description block comprising:

a plurality of disk data fields that identify locations in a memory where disk data for a parity operation is stored;

an output field that identifies a location in the memory where the results of the parity operation are to be stored;

a coefficient field that identifies a plurality of coefficients that are to be used, in conjunction with the disk data, to generate the results; and an operation type identifier that identifies a type of the parity operation that is to be performed based on the disk data.

25. A task description block as recited in claim 24, wherein the disk data includes a data segment.

26. A task description block as recited in claim 24, wherein the disk data includes a parity segment.

27. A task description block as recited in claim 24, further comprising a coefficient pointer and data field that identifies a location in a coefficient table where a subset of coefficients to be used for the parity operation are located.

* * * * *